Sept. 15, 1931.  J. F. FELIES  1,823,681
APPARATUS FOR CONVERTING RECIPROCATING MOTION
INTO ROTARY MOTION OR VICE VERSA
Filed Aug. 2, 1929
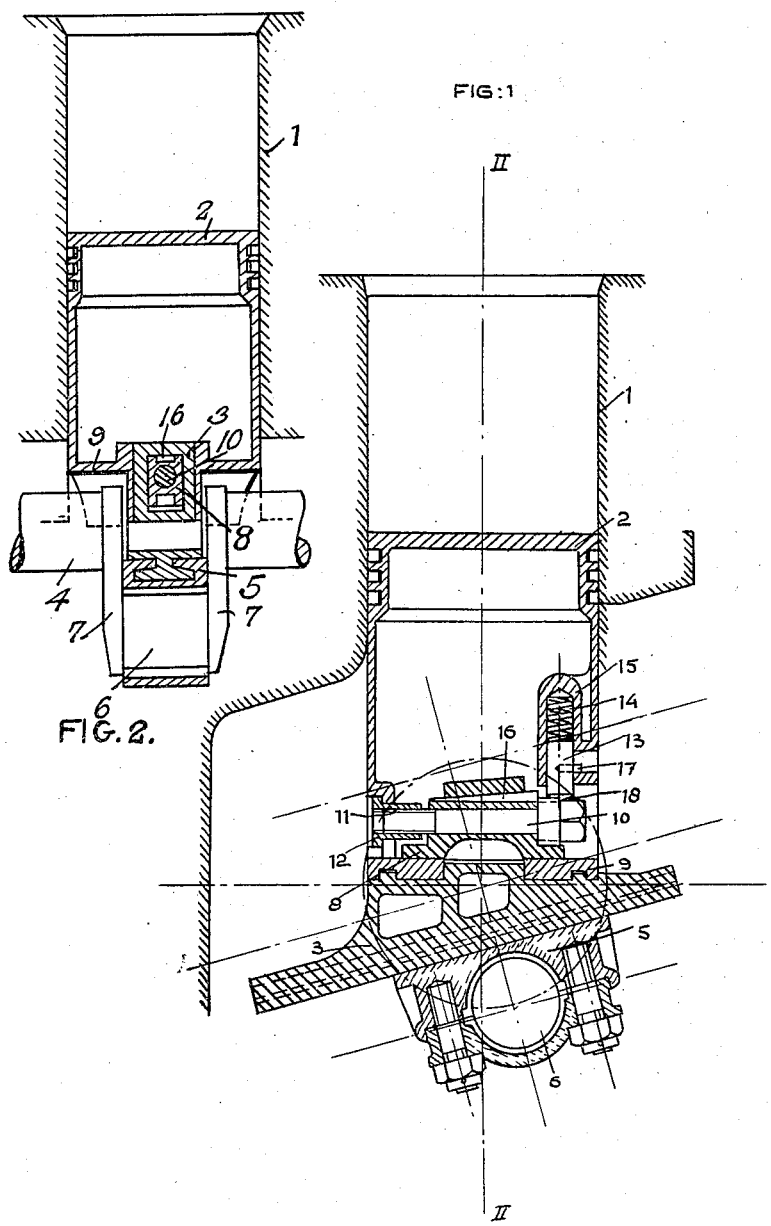

Patented Sept. 15, 1931

1,823,681

UNITED STATES PATENT OFFICE

JACQUES FRANÇOIS FELIES, OF ANTWERP, BELGIUM

APPARATUS FOR CONVERTING RECIPROCATING MOTION INTO ROTARY MOTION OR VICE VERSA

Application filed August 2, 1929, Serial No. 382,918, and in the Netherlands April 17, 1929.

The invention relates to an apparatus for converting reciprocating motion into rotary motion or vice versa, by means of a guide body moved by a piston-like body and by means of a guide block moved by said guide body and arranged on a crank pin, preferably as described in my co-pending U. S. patent application Serial No. 302,492 of 29th August, 1928.

The invention consists therein that the piston-like body and the guide body are directly or indirectly clamped against each other by means of one or more wedges or the like.

The apparatus is preferably made in such a manner that the wedge carries the guide body. For this purpose the wedge is inserted from the outside through an opening in the wall of the piston-like body and through the guide body into a second opening in the wall of the piston-like body opposite the first mentioned opening.

In order to enable the wedge to be gradually tightened, it may be pressed or hammered but preferably a draw bolt is made use of.

In order to obtain a compact piston and cylinder construction the wedge and the draw bolt or other locking member are designed in such a manner that they are situated entirely within the periphery of the piston.

Further, the wedge or the draw bolt or other locking member are automatically locked, thus preventing accidents through negligence.

A preferred embodiment of the invention as applied to a single-acting internal combustion engine is shown in the annexed drawings.

Fig. 1 is a cross sectional view of the guide body and the piston body in the plane of the crank motion.

Fig. 2 is a sectional view on the line II—II of Fig. 1.

In the drawings, 1 is the combustion cylinder, 2 the piston, 3 the guide body, 4 the crankshaft, 5 the crank pin block or guide block embracing the crank pin 6 of the crank (the webs of which are denoted by 7), and 8 a wedge resting upon an inner flange 9 of the piston 2 and supporting in this manner the guide body 3; 10 is a draw bolt provided with a screw-thread 11; 12 is a sleeve provided with an inner screw-thread which is engaged by the screw-threaded end of the draw bolt so that by screwing up the draw bolt the wedge is set; 13 is a locking pin engaging one of a number of recesses arranged around the bolt and preventing the bolt from being released by vibration, by means of which the wedge 8 is prevented from becoming loose; 14 is a spring within a bush 15 on the piston in which the pin 13 is guided. The wedge 8 is provided with a groove 16 which enables the wedge 8 to be removed without being hindered in any way by the locking pin 13. Further, 17 is a retaining pin for the locking pin 13, preventing the pin 13 from dropping out of the bush 15. As appears from Fig. 1 the locking extremity of the locking pin 13 is provided with an inclined surface 18. If a box spanner or socket wrench is put over the head of the draw bolt 10 in order to release the wedge, the spanner will engage this inclined plane 18, resulting in an upward movement of the locking pin 13 which therefore clears the locking recess of the bolt.

In withdrawing the spanner the bolt will be immediately locked again by downward movement of the pin 13 under the influence of the spring 14. This locking action is therefore absolutely automatic so that it is impossible to give occasion to accidents on account of imprudence or negligence.

What I claim is:—

1. Apparatus for converting reciprocating motion into rotary motion or vice versa, comprising a piston body, a guide body co-operating therewith, a guide block co-operating with said guide body, a crank pin engaging said guide block and pulling means within said piston body pulling said guide body towards said piston body.

2. Apparatus for converting reciprocating motion into rotary motion or vice versa, comprising a piston body, a guide body co-operating therewith, a guide block co-operating with said guide body, a crank pin engaging said guide block and a wedge within said piston pulling said guide body towards said piston body.

3. Apparatus for converting reciprocating motion into rotary motion or vice versa, comprising a piston body, a guide body cooperating therewith, a guide block co-operating with said guide body, a crank pin engaging said guide block, a pulling means within said piston pulling said guide body towards said piston body and means for locking said pulling means to said piston body.

4. Apparatus for converting reciprocating motion into rotary motion or vice versa, comprising a piston body, a guide body cooperating therewith, a guide block co-operating with said guide body, a crank pin engaging said guide block, a wedge within said piston pulling said guide body towards said piston body and a draw bolt locking said wedge to said piston body.

5. Apparatus for converting reciprocating motion into rotary motion or vice versa, comprising a piston body, a guide body cooperating therewith, a guide block co-operating with said guide body, a crank pin engaging said guide block, a pulling means within said piston pulling said guide body towards said piston body, means for locking said pulling means to said piston body and automatic locking means engaging said first-mentioned locking means and preventing movement thereof.

6. Apparatus for converting reciprocating motion into rotary motion or vice versa, comprising a piston body, a guide body cooperating therewith, a guide block co-operating with said guide body, a crank pin engaging said guide block, a pulling means within said piston pulling said guide body towards said piston body, a locking member locking said pulling means to said piston body, recesses provided in said locking member and a pin resiliently mounted engaging one of said recesses, said pin being inclined adjacent the engaging portion thereof.

JACQUES FRANÇOIS FELIES.